United States Patent
Baitz et al.

(10) Patent No.: US 10,554,933 B2
(45) Date of Patent: Feb. 4, 2020

(54) REVERSE VENDING MACHINE

(71) Applicant: WINCOR NIXDORF INTERNATIONAL GmbH, Paderborn (DE)

(72) Inventors: Guenter Baitz, Berlin (DE); Wolfgang Malke, Berlin (DE); Uwe Krueger, Berlin (DE); Oliver Schaefer, Berlin (DE)

(73) Assignee: Wincor Nixdorf International GmbH, Paderborn (DE)

(*) Notice: Subject to any disclaimer, the term of this patent is extended or adjusted under 35 U.S.C. 154(b) by 14 days.

(21) Appl. No.: 14/962,607

(22) Filed: Dec. 8, 2015

(65) Prior Publication Data

US 2016/0182861 A1 Jun. 23, 2016

(30) Foreign Application Priority Data

Dec. 17, 2014 (EP) .................................... 14198680

(51) Int. Cl.
*G07F 7/06* (2006.01)
*G06K 9/78* (2006.01)
*H04N 7/18* (2006.01)

(52) U.S. Cl.
CPC ................. *H04N 7/18* (2013.01); *G06K 9/78* (2013.01); *G07F 7/0609* (2013.01)

(58) Field of Classification Search
CPC ........................................................ H04N 7/18
USPC .................................................. 348/61; 34/61
See application file for complete search history.

(56) References Cited

U.S. PATENT DOCUMENTS

| 2007/0292117 A1* | 12/2007 | Saether | G01N 21/8806 396/20 |
| 2012/0209741 A1* | 8/2012 | Bonner | G06Q 30/08 705/26.3 |
| 2012/0255967 A1* | 10/2012 | Hecht | A21B 3/07 221/150 A |
| 2014/0218510 A1* | 8/2014 | Nordbryhn | G07F 7/0609 348/131 |

FOREIGN PATENT DOCUMENTS

| CN | 101176124 A | 5/2008 | |
| EP | 0363837 A2 | 4/1990 | |
| EP | 2 363 837 | 9/2011 | |
| EP | 2363837 A1 * | 9/2011 | ........... B07C 5/3412 |

(Continued)

OTHER PUBLICATIONS

European Search Report dated Jun. 26, 2015.
Office Action issued in corresponding Chinese patent application; 12 pages.

*Primary Examiner* — Joseph G Ustaris
*Assistant Examiner* — Amir Shahnami
(74) *Attorney, Agent, or Firm* — Black, McCuskey, Souers & Arbaugh, LPA

(57) ABSTRACT

A reverse vending machine has an insertion area for inserting an object into the inside of the reverse vending machine, a transport unit for transporting the object in a transport area along a transport axis and an arrangement of cameras for capturing images of the object from several capturing directions. The image capturing direction of each camera is directed toward the transport area. Further, the cameras are arranged outside the transport area and not below the transport area.

15 Claims, 2 Drawing Sheets

(56) References Cited

FOREIGN PATENT DOCUMENTS

| | | | |
|---|---|---|---|
| EP | 2 378 494 | 10/2011 | |
| EP | 2378494 A2 | 10/2011 | |
| EP | 2 538 393 | 12/2012 | |
| EP | 2538393 A1 | 12/2012 | |
| WO | 2009/021515 | 2/2009 | |
| WO | 2009021515 A1 | 2/2009 | |
| WO | WO 2009021515 A1 * | 2/2009 | ............. B07C 5/126 |

* cited by examiner ic # REVERSE VENDING MACHINE

BACKGROUND

1. Field of the Invention

The invention relates to a reverse vending machine. The reverse vending machine comprises an insertion area for inserting an object into the inside of the reverse vending machine, a transport unit for transporting the object in a transport area along a transport axis and an arrangement of cameras for capturing images of the object from several capturing directions.

2. Description of the Related Art

From the prior art, a reverse vending machine having a ring scanner is known. In the known reverse vending machine, the scanner is arranged around the bottle feed-in funnel as a closed ring. The viewing direction of the scanner cameras originates from the reflective vertical glass surface obliquely towards the rear. In the closed state, a gap of about 30 mm exists between the ring scanner and the transport belt arranged behind it. The package can only be scanned from below since the cameras scan from below at an angle to the rear through this gap between scanner and transport belt. By means of this arrangement, the depth of the scanner in transport direction also defines the depth by which the customer reaches into the machine until the customer can place the package on the transport belt. In doing so, residual amounts of liquids can run out of the packages through the gap and downward and can contaminate the camera lens. Thus, the known reverse vending machine has the disadvantage that the cameras provided underneath the transport belt can be contaminated by liquids running out from packages placed above them, as a result whereof the recognition performance of the ring scanner is reduced.

Based on the known prior art, it is the object of the invention to specify a reverse vending machine that enables an easy and reliable capturing of images of an object to be scanned.

SUMMARY

The invention relates to a reverse vending machine that provides an easy and reliable capturing of images of an object to be scanned. More particularly, the reverse vending machine of the invention has an insertion area for inserting an object into the inside of the reverse vending machine, a transport unit for transporting the object in a transport area along a transport axis and an arrangement of cameras for capturing images of the object from several capturing directions. The image capturing direction of each camera is directed towards the transport area. Further, the cameras are arranged outside a camera-free area. The camera-free area comprises the transport area and the area perpendicularly below the transport area, wherein perpendicularly below refers to the position during a designated use of the reverse vending machine in operation. This means that the cameras are arranged outside the transport area and not perpendicularly below the transport area. Thus, a contamination of cameras provided underneath the transport area by liquids that run out of an object inserted into the transport area can be prevented. This enables easy and reliable capturing of images of the object to be scanned.

The insertion area may be formed by an insertion funnel. The transport area lies in the capturing area directly behind the insertion funnel or behind the insertion area in transport direction. The width of the transport area may correspond to the diameter of the inner circumference of the insertion funnel or the lateral extension of the insertion area. Further, the height of the transport area corresponds at least to the height of the object or the diameter of the inner circumference of the insertion funnel or the vertical extension of the insertion area.

The arrangement of cameras may comprise a pair of cameras arranged outside the camera-free area laterally next to the transport unit. The cameras of the pair have a distance greater than the lateral extension of the transport area. Thus, the object can be captured from two capturing directions at an angle from below without the cameras of the pair being located in the camera-free area perpendicularly below the transport area. In other words, no camera of the camera arrangement is provided underneath the width of the transport area.

At least a part of the transport unit may be movable up into the area perpendicularly below the transport area. This results in an improved transport belt placement. Further, an almost perpendicular viewing direction, i.e. an image capturing direction that is perpendicular to the transport direction, onto the freely movable object is made possible.

The arrangement of cameras may comprise a U-shape. The transport area and the area perpendicularly below the transport area are surrounded by the U-shaped arrangement of cameras. In particular, the camera arrangement can be a horseshoe-shaped arrangement. Thus, the camera-free area can be provided in the area of the horseshoe-shaped arrangement that is open to the inside.

The transport area and the area perpendicularly below the transport area may extend along the longitudinal axis of the arrangement of cameras perpendicularly to the transport axis. Thus, the camera-free area can substantially extend over the entire length of the legs of the horseshoe-shaped arrangement.

The lower end of the arrangement of cameras may be arranged at the same height as the lower end of the transport unit. Thus, the camera-free area also extends up to the lower end of the transport unit.

The transport unit may comprise a transport belt that is positioned directly below the transport area. Thus, the object can be received reliably by the transport belt and can be transported into the inside of the reverse vending machine.

The arrangement of cameras may comprise at least a first pair of cameras and a second pair of cameras. The first pair of cameras is arranged in a first area adjacent to the transport area and above the transport area and the second pair of cameras is arranged in a second area adjacent to the area perpendicularly below the transport area and laterally next to the transport unit. Thus, the object can be captured from at least four capturing directions radially from above and radially from below, respectively.

The cameras may be arranged such that the object is completely captured in a capturing plane that is perpendicular to the transport axis. Thus, a 360° detection of the object by means of the camera arrangement is made possible.

The cameras may be arranged such that the object is captured from at least four capturing directions. Here, the capturing directions each form an angle of greater than 90° to each other.

The cameras may be arranged such that the object is captured from several capturing directions which each have an angle of 90° relative to the transport axis. Thus, the substantially perpendicular viewing direction, i.e. the image capturing direction perpendicular to the transport direction, of the object can be realized. As a result, perspective distortions during the capturing of images of the object can be prevented or at least reduced. In particular, pre-processing steps involving high computational costs can be dispensed with, thereby making use of simpler algorithms for the recognition possible.

The reverse vending machine may be characterized by an insertion funnel with the insertion area, with funnel being arranged above the transport unit. The insertion funnel extends in transport direction from a first side to a second side. Further, the transport unit and the insertion funnel are spaced from each other so that there results a free gap between the second side of the insertion funnel and a side of the transport unit facing this side. As a result of the free gap between the insertion funnel and the transport unit, the view from below, i.e. the capturing by means of two cameras arranged laterally next to the transport unit is made possible.

The extension of the free gap may be variably adjustable parallel to the transport axis. Thus, the viewing gap for the two cameras arranged laterally next to the transport unit can be increased or decreased.

The extension of the free gap parallel to the transport axis is, for example, between 40 mm and 60 mm. Preferably, it is between 20 mm and 30 mm. Thus, the transport unit can be moved very close to the rear of the insertion funnel.

The distance between the first side of the insertion funnel and the transport unit may be shorter than 100 mm. Thus, a relatively small input depth for the object from the front of the insertion funnel up to the beginning of the transport unit can be realized.

The reverse vending machine may be characterized by a device for collecting foreign substances coming from the object. The device may be arranged in the area perpendicularly below the transport area. Thus, a suitable collecting device for liquids and other remainders and foreign particles can be provided perpendicularly below the transport belt.

Further features and advantages of the invention result from the following description which explains the invention in more detail on the basis of embodiments in connection with the enclosed Figures.

DETAILED DESCRIPTION

Figure 1:
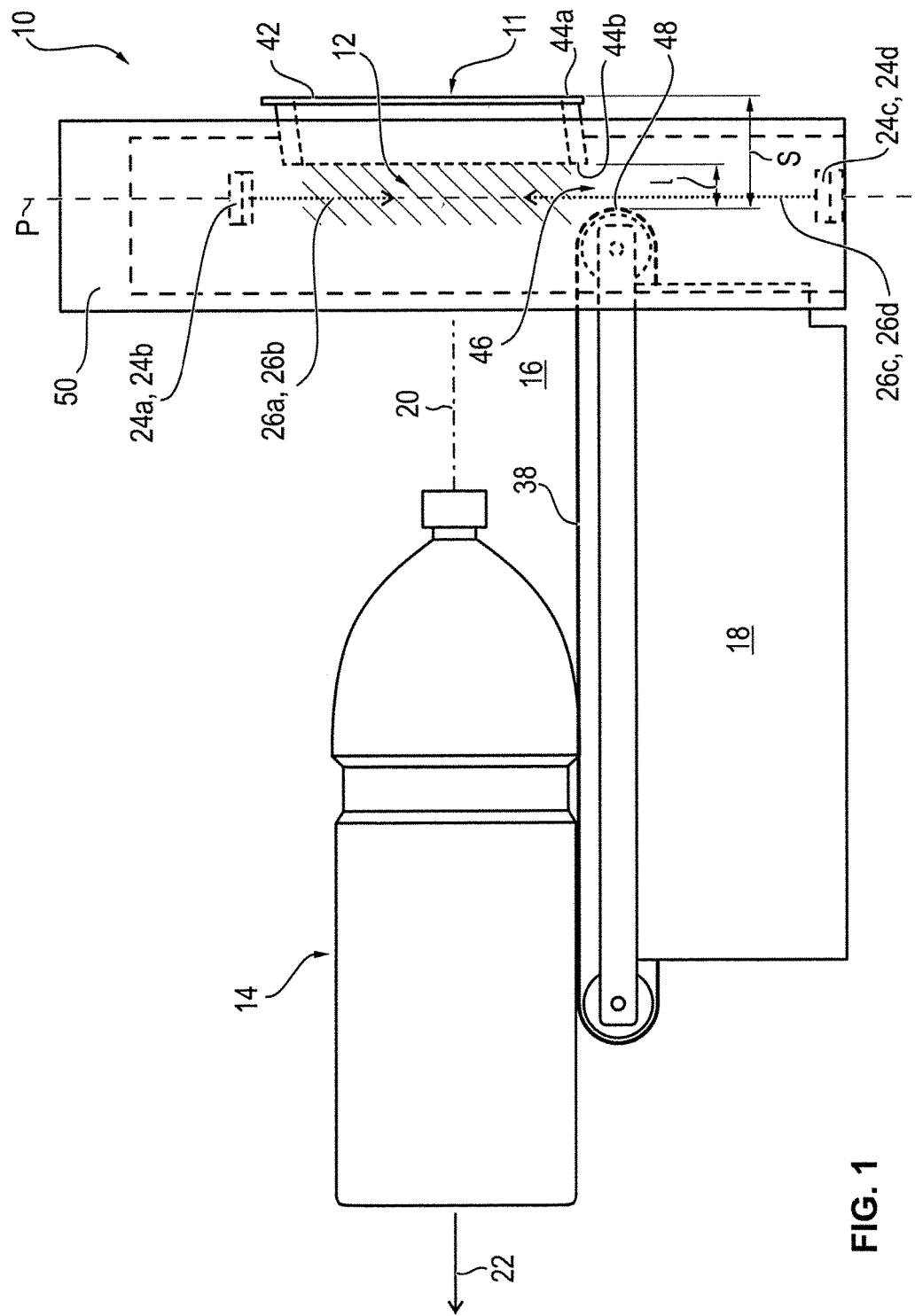
FIG. 1 shows a side view of a reverse vending machine with an insertion area, a transport unit and an arrangement of cameras.

FIG. 1 shows a side view of a reverse vending machine with an insertion area 11, a transport unit 18 and an arrangement of cameras 24a to 24d. In FIG. 1, a transport axis 20, a transport direction 22 and a capturing plane P perpendicular to the transport direction 22 are shown. The transport axis 20 corresponds to the center of the object 14 transported along the transport axis 20. The object 14 is a package, such as a bottle. The object 14 is transported by means of the transport unit 18 in a transport area 12 along the transport axis 20 in the transport direction 22. The transport direction 22 is a direction which is directed from the insertion area 11 parallel to the transport axis into the inside 16 of the reverse vending machine 10. The insertion area 11 is formed by an insertion funnel 42. The transport area 12 lies in the capturing plane P directly behind the insertion funnel 42 in transport direction 22. The arrangement of cameras 24a to 24d is provided in a scanner housing 50.

As shown in FIG. 1, the arrangement of cameras 24a to 24d is oriented perpendicularly to the transport direction 22. The cameras 24a to 24d lie in the capturing plane P. Further, a first pair of cameras 24a, 24b is arranged above the transport area 12, while a second pair of cameras 24c, 24d is arranged laterally next to the transport unit 18. By means of the cameras 24a, 24b of the first pair the object 14 is captured from above in the capturing plane P from two assigned capturing directions 26a, 26b. Further, the object 14 is captured from below by means of the cameras 24c, 24d of the second pair in the capturing plane P from two assigned capturing directions 26c, 26d. In particular, the arrangement of cameras 24a to 24d provided in the scanner housing 50 makes a 360° recognition of the object 14 possible.

In operation, the object 14 is inserted via the insertion area 12 into the inside 16 of the reverse vending machine 10. The object 14 is received by a transport belt 38 of the transport unit 18 in the transport area 12 and is transported along the transport axis 20 in the transport direction 22. When the object 14 is in the transport area 12 lying in the capturing plane P, the object 14 is completely captured from the capturing directions 26a to 26d. The capturing of images of the object 14 serves to recognize specific features of the object 14, such as a barcode, a safety feature, a shape and/or a label of the object 14.

The transport belt 38 of the transport unit 18 can be positioned relative to the insertion funnel 42. In particular, the transport belt 38 is movable up into the area of the scanner housing 50. As shown in FIG. 1, the transport belt 38 is arranged directly below the transport area 12 lying in the capturing plane P. The insertion funnel 42 extends in transport direction 22 from a first side 44a, i.e. the front side of the insertion funnel 42, to a second side 44b, i.e. the rear side of the insertion funnel 42. Further, the transport belt 38 of the transport unit 18 and the insertion funnel 42 are spaced from each other such that there results a free gap 46 between the rear side 44b of the insertion funnel 42 and a side 48 facing this side 44b, i.e. the front side of the transport belt 38. The free gap 46 in particular makes the capturing of the object 14 from the capturing directions 26c, 26d by means of the cameras 24c, 24d possible.

The extension 1 of the free gap 46 parallel to the transport direction 22 is variably adjustable. This is achieved in that the transport belt 38 of the transport unit 18 can be positioned arbitrarily relative to the insertion funnel 42. For example, the extension 1 of the free gap 46 parallel to the transport direction 22 is between 40 mm and 60 mm. Preferably, the extension 1 of the free gap 46 is between 20 mm and 30 mm. Further, the distance s between the front side 44a of the insertion funnel 42 and the front side 48 of the transport belt 38 is smaller than 100 mm. By means of this dimensioning, there results a relatively small input depth for the object 14, while at the same time a suitable viewing gap for the cameras 24c, 24d of the second pair is provided.

Figure 2:
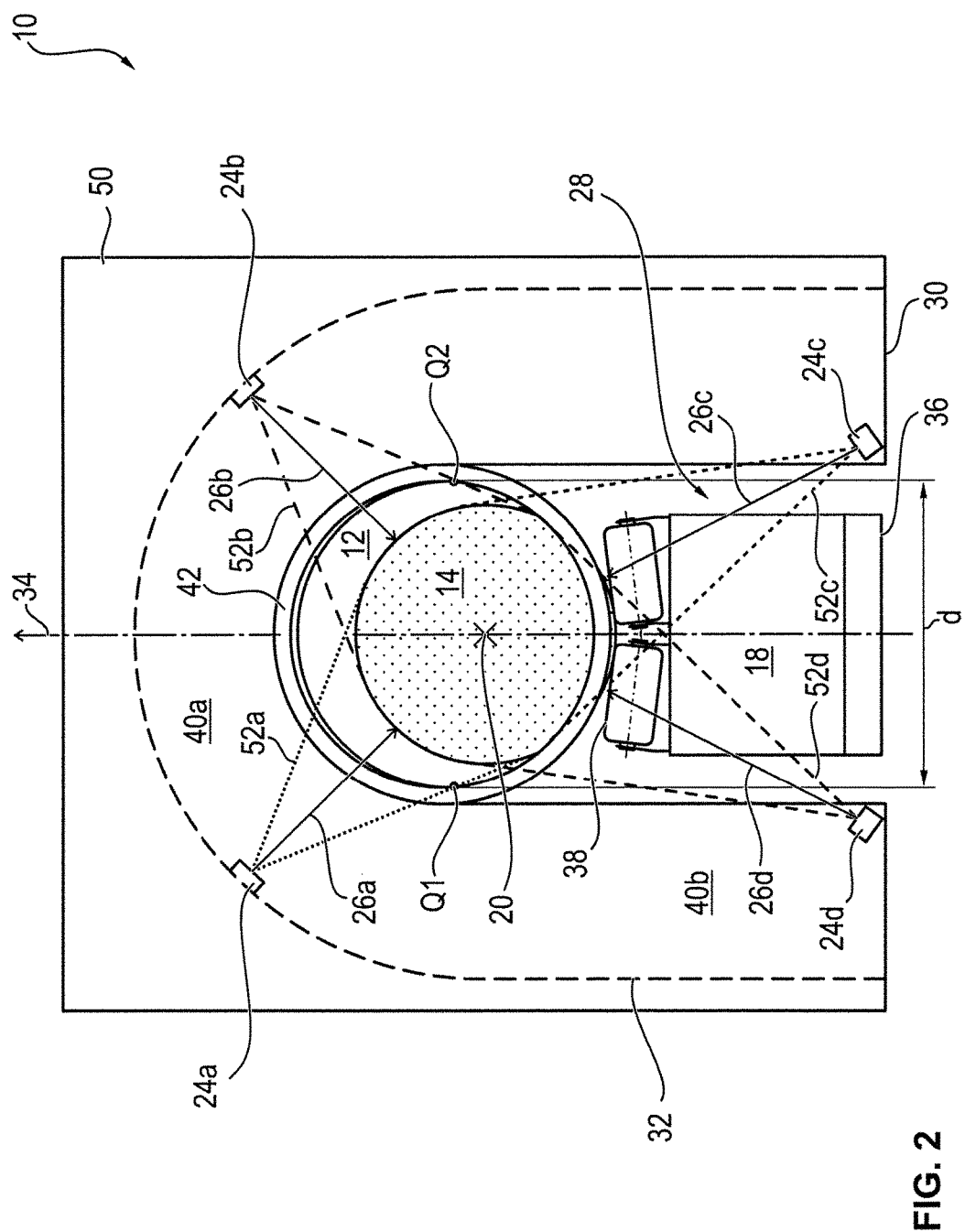
FIG. 2 shows a front view of the reverse vending machine according to FIG. 1 with a horseshoe-shaped camera arrangement.

FIG. 2 shows a front view of the reverse vending machine 10 according to FIG. 1 with a horseshoe-shaped camera arrangement 24a to 24d. In FIG. 2, the transport area 12 is well visible. The width d of the transport area 12 corresponds to the diameter of the inner circumference of the insertion funnel 42. The height of the transport area 12 corresponds at least to the height of the object 14 or the diameter of the inner circumference of the insertion funnel 42.

As shown in FIG. 2, the camera arrangement 24a to 24d comprises a U-shape or a horseshoe-shape 32. Further, it is well visible in FIG. 2 that the U-shaped or horseshoe-shaped camera arrangement 24a to 24d surrounds a camera-free area 28, i.e. an area in which no camera for capturing the object 14 is arranged. The camera-free area 28 is adjacent to the inside, i.e. the side facing the transport axis 20, of the horseshoe-shape 32. Further, the camera-free area 28 extends at least over the entire width d of the transport area 12 up to the lower end 30 of the camera arrangement 24a to 24d, i.e. the camera-free area 28 is always characterized at least by the width d from a lower end of the transport area 12 up to the lower end 30 of the camera arrangement 24a to 24d. In particular, the camera-free area 28 extends from the lower end 30 of the camera arrangement 24a to 24d along the longitudinal axis 34 of the same perpendicular to the transport axis 20 up to an upper end of the transport area 12.

The camera-free area 28 comprises the transport area 12 and the area perpendicularly below the transport area 12. The area perpendicularly below the transport area 12 corresponds at least to the area which is defined by the perpendicular of the respective lateral boundary points Q1, Q2 of the diameter of the inner circumference of the insertion funnel 42. By providing the camera-free area 28 it is made possible that the transport belt 38 that is directly arranged below the transport area 12 is movable up into this camera-free area 28 below the transport area 12. As described with reference to FIG. 1, the transport belt 38 is thus movable very close to the insertion funnel 42 up into the scanner housing 50. The lower end 30 of the camera arrangement 24a to 24d is arranged approximately at the same height as the lower end 36 of the transport unit 18.

In FIG. 2, the first pair of cameras 24a, 24b and the second pair of cameras 24c, 24d are well visible. The first pair of cameras 24a, 24b is arranged in a first area 40a above the transport area 12 and surrounding the camera-free area 28. Further, the second pair of cameras 24c, 24d is arranged in a second area 40b laterally next to the transport unit 18 and surrounding the camera-free area 28. As shown in FIG. 2, the cameras 24a, 24b of the first pair are provided on the outside, i.e. the side facing away from the transport axis 20, of the horseshoe-shape 32, whereas the cameras 24c, 24d of the second pair are provided on the inside of the horseshoe shape 32 opposite to the outside. Further, it is shown in FIG. 2 that the cameras 24c, 24d of the second pair have a distance which is greater than the lateral extension d of the transport area 12, i.e. the extension of the same perpendicular to the longitudinal axis 34 of the camera arrangement 24a to 24d. In the camera arrangement 24a to 24d shown in FIG. 2, the cameras 24a, 24b of the first pair and the cameras 24c, 24d of the second pair are each time arranged symmetrically to the longitudinal axis 34 of the camera arrangement 24a to 24d.

With reference to FIGS. 1 and 2, the cameras 24a to 24d are arranged such that the object 14 is completely captured in the capturing plane P perpendicular to the transport direction 22. This 360° detection is in particular achieved by a capturing of images of the object 14 located in one single position. In doing so, the object 14 is completely captured by means of the cameras 24a to 24d without the object 14 being rotated into different positions.

With reference to FIG. 2, the camera arrangement 24a to 24d is configured such that the object 14 is captured from the four capturing directions 26a to 26d which are assigned to the cameras 24a to 24d. Here, the capturing directions 26a to 26d each form an angle of greater than 90° to each other. Further, the angles of view 52a to 52d of the individual cameras 24a to 24d intersect each other such that there do not remain any capturing-free areas on the surface of the object 14. The capturing directions 26a to 26d assigned to the cameras 24a to 24d are each time directed from the cameras 24a, 24b at an angle from above and from the cameras 24c, 24d at an angle from below to the center of the object 14 or the transport axis 20. Further, the capturing directions 26a to 26d each have an angle of 90° relative to the transport direction 22. Thus, the object 14 is captured in the plane P perpendicular to the transport direction 22.

Foreign substances coming from the object 14, such as liquids running out, can be collected by a collecting device arranged in the camera-free area 28 perpendicularly below the transport area 12. The collecting device comprises, for example, a container from which the collected foreign substances can be drained off.

The present invention thus provides a 360° scanner in the form of a horseshoe 32 having an area 28 that is open at the bottom and camera-free, respectively. As shown in FIG. 2, the viewing direction of the cameras 24a to 24d is directed radially from the inner surfaces of the horseshoe 32 onto the package 14. An advantage is that directly underneath the package 14 there is no optical surface which could be contaminated. Further, as shown in FIG. 1, the transport belt 38 can be arbitrarily inserted into the opening of the scanner housing 50. As a result, the free gap 46 between the transport belt 38 and the insertion funnel 42 through which the cameras 24c, 24d of the second pair look radially at the package 14 can be adjusted variably in size and position. In this way, the transport belt 38 can be brought relatively close to the front of the reverse vending machine 10, as a result whereof the depth by which the user reaches into the machine can be reduced as compared to the prior art.

The present invention in particular provides a horseshoe-shaped camera arrangement, the cameras 24a to 24d of which are arranged such that they can altogether look at the package 14 from all sides all around. The inventive arrangement and division of the angles of view 52a to 52d of the cameras make it possible that the views at the package 14 radially to the transport direction 22 are largely distortion-free at any angle within the 360° range of angles. Thus, an improved recognition of the required features such as barcode, safety feature, shape, label and other relevant features is possible. The view from below is guaranteed by means of the free gap 46 between the insertion funnel 42 and the transport unit 18.

By means of the almost perpendicular viewing direction at the package 14, an easier recognition is possible in that pre-processing steps involving high computational costs, such as affine transformations, can be dispensed with due to non-existing or only slightly existing perspective distortions. The resulting use of simpler algorithms makes a higher recognition speed or a lower processing time possible and results in a higher performance in the acceptance of the package 14 by the system 10.

According to the present invention, the camera arrangement 24a to 24d is designed in an open manner at the bottom, and indeed such that there are no inwardly extending horizontal or inclined surfaces, curvatures or edges. Thus, the risk of a contamination by dripping or running-out residual amounts of liquids or other contents from the partly open packages or other contaminations from the outside of the packages, such as weather and location-induced contaminations as well as environmental contaminations, such as loosely adhering sand or rain drops, can be prevented or, compared to known solutions, at least be clearly minimized. The reduced susceptibility to contaminations achieved in this way allows for a less complex cleaning of the system or a longer possible operating time of the system without cleaning. Here, there is no decrease in the recognition performance of the camera arrangement. Thus, longer cleaning intervals are possible. The collecting device arrangeable below the package 14 can collect and possibly drain off the liquids and other residual amounts as well as foreign particles, such as sand or other dirt.

Further advantages of the inventive reverse vending machine 10 are that the transport belt 38 can be positioned variably to the insertion funnel 42 since it can "dip into" the scanner housing 50. The viewing gap 46 for the cameras 24c, 24d between the transport unit 18 and the insertion funnel 42 is thus variably adjustable. If the transport unit 18 is, for example, moved very close, preferably 20 mm to 30 mm to the rear side 44b of the insertion funnel 42 then the acceptance and the further transport or the rejection and the return transport of the package 14 can be accomplished very early. By means of the small gap size it can also be prevented that in the area between the input and the transport belt 38 packages with small dimensions, such as short or heavily deformed cans or bottles, fall through between them, are left or get stuck thereat. Further, this results in a lower possibility of a contamination of areas underneath. The associated significantly reduced input depth for packages from the front edge 44a of the input opening to the beginning 48 of the transport unit 18 of altogether less than 100 mm further offers the following advantages to the user as compared to the prior art (input depth of about 160 mm). The user has a more pleasant feeling since he/she does not have to insert his/her hand deeper into the opening for the package. There results a better ergonomics in the return operation since the required arm movement of the user can be shorter. Further, there results a faster, tactile feeling in the acceptance of the package. There results a faster rejection of the package, in particular by the return transport of the package when it has been recognized as being an invalid package. Ideally, this still happens while the customer holds the package in the hand, as a result whereof, here too, the tactile feeling is promoted and the understanding of the customer for the invalid input is enhanced and accelerated. In particular, there results a reduced system depth, i.e. a reduced "footprint" of the system.

Altogether, there result the following advantages. Contaminations can drop down without problems and, in doing so, do not contaminate the optically effective surfaces of the camera arrangement 24a to 24d. A scratching of the optically effective surfaces of the camera arrangement 24a to 24d is not possible since packages cannot be placed thereon. The transport unit 18 and the insertion funnel 42 can variably dip into the area of the scanner housing 50 while at the same time the optically effective and required camera viewing surfaces are preserved. As a result, there is a reduction of the input depth as well as of the entire system depth. In contrast to known solutions, the camera arrangement 24a to 24d looks at the package 14 at an angle of 90° relative to the transport axis 20. Therefore, the transport belt 38 does not have to be placed behind the scanner housing 50.

LIST OF REFERENCE SIGNS 10 reverse vending machine
11 insertion area
12 transport area
14 object
16 inside of reverse vending machine
18 transport unit
20 transport axis
22 transport direction
24a,24b,24c,24d cameras
28 camera-free area
30 lower end of the camera arrangement
32 U-shape
34 longitudinal axis of camera arrangement
36 lower end of transport unit
38 transport belt
40a, 40b area of the camera arrangement
42 insertion funnel
44a, 44b side of the insertion funnel
46 free gap
48 side of the transport unit
50 scanner housing
52a to 52d angle of view
Q1, Q2 lateral boundary point of transport area

What is claimed is:

1. A reverse vending machine, comprising:
an insertion area for inserting an object into the reverse vending machine in a transport direction along a transport axis, a width axis perpendicular laterally across the transport access, and a height axis substantially perpendicular to the transport axis and to the width axis;
a transport unit for transporting the object along the transport axis,
a free gap comprising the area between the insertion area and the transport unit along the transport axis and across the width axis,
a transport area located immediately above the free gap along the height axis and having a height substantially equivalent to a height of the object along the height axis, a width substantially equivalent to a width of the object along the width axis, and a length substantially equivalent to a length of the free gap along the transport axis,
an arrangement of cameras for capturing images of the object from several capturing directions, wherein:
the image-capturing direction of each camera is directed towards the free gap, and
the cameras are arranged outside a camera-free area,
a lower area comprising a volume located perpendicularly below a base of the transport area along the height axis, having a height that is a distance from a lowest end of the arrangement of cameras to the base of the transport area along the height axis, a width substantially equivalent to the width of the object along the width axis, and a length substantially equivalent to the length of the free gap along the transport axis, and
the camera-free area comprising the transport area and the lower area.

2. The reverse vending machine of claim 1, wherein the transport unit is movable parallel to the transport axis up into at least some of the area perpendicularly below the free gap with such movement comprising longitudinal movement in addition to the rotational movement of the transport belt around a roller of the transport unit.

3. The reverse vending machine of claim 1, wherein the arrangement of cameras defines a substantially U-shape, and the camera-free area is surrounded by the U-shaped arrangement of cameras.

4. The reverse vending machine of claim 1, wherein a lower end of the arrangement of cameras is arranged at the same height and such lower end of the arrangement of cameras and a lower end of the transport unit are at a common height.

5. The reverse vending machine of claim 1, wherein the transport unit comprises a transport belt that can be positioned directly below at least part of the transport area.

6. The reverse vending machine of claim 1, wherein the arrangement of cameras comprises at least a first pair of cameras and a second pair of cameras, wherein the first pair of cameras is arranged in a first area above the free gap and adjacent to the transport area and the second pair of cameras is arranged in a second area laterally next to the transport unit and adjacent to the lower area.

7. The reverse vending machine of claim 1, wherein the cameras are arranged such that the object is captured completely in a capturing plane perpendicular to the transport axis.

8. The reverse vending machine of claim 1, wherein the cameras are arranged such that the object is captured from at least four capturing directions, and that the field of vision of each capturing direction has an angle of greater than 90°.

9. The reverse vending machine of claim 1, wherein the cameras are arranged such that the object is captured from several capturing directions which each have an angle of 90° relative to the transport axis.

10. The reverse vending machine of claim 1, further comprising an insertion funnel with the insertion area arranged above the transport unit, wherein the insertion funnel extends in transport direction from a first side to a second side, wherein the transport unit and the insertion funnel are arranged spaced from each other such that the free gap is located between the second side of the insertion funnel and a side of the transport unit facing the second side of the insertion funnel.

11. The reverse vending machine of claim 10, wherein an extension of the free gap is variably adjustable parallel to the transport axis.

12. The reverse vending machine of claim 10, wherein an extension of the free gap parallel to the transport axis is between 40 mm and 60 mm.

13. The reverse vending machine of claim 12, wherein the distance between the first side of the insertion funnel and the transport unit is smaller than 100 mm.

14. The reverse vending machine of claim 1, further comprising a device for collecting foreign substances coming from the object, the device being arranged in the area perpendicularly below the free gap.

15. The reverse vending machine of claim 10, wherein an extension of the free gap parallel to the transport axis is between 20 mm and 30 mm.

\* \* \* \* \*